United States Patent [19]
Kohn et al.

[11] 3,819,960
[45] June 25, 1974

[54] CONTROLLER CIRCUIT

[75] Inventors: Mitchell I. Kohn, Arlington Heights; Ahdor Hermyrt Alton, Lake Zurich, both of Ill.

[73] Assignee: Love Controls Corporation, Wheeling, Ill.

[22] Filed: Jan. 26, 1973

[21] Appl. No.: 326,949

Related U.S. Application Data

[63] Continuation-in-part of Ser. No. 249,287, May 1, 1972, Pat. No. 3,777,187.

[52] U.S. Cl................. 307/310, 219/494, 219/501, 219/510, 307/235 R
[51] Int. Cl.............................................. H01v 3/00
[58] Field of Search......... 307/310, 235 R; 219/489, 219/494, 497, 499, 501, 510

[56] References Cited
UNITED STATES PATENTS

| | | | |
|---|---|---|---|
| 3,479,487 | 11/1969 | Stoll | 219/494 |
| 3,553,428 | 1/1971 | McGhee | 219/494 |
| 3,678,247 | 7/1972 | Sawa et al | 219/501 |
| 3,684,172 | 8/1972 | Evalds | 219/510 X |

Primary Examiner—John Zazworsky
Attorney, Agent, or Firm—Alter, Weiss, Whitesel & Laff

[57] ABSTRACT

An improved controller that provides features, such as signal summing after amplification of the error signal, thereby minimizing adverse noise effects utilizing full scale amplification to enable analog display of the monitored parameter and conversion of a normal signal. The amplified error signal may be treated by a rate circuit to reduce lag problems. One of the amplifier stages includes feedback to provide proportioning output control through a solid state driver circuit that offers features, such as zero cross over detection, full cycle operation and excellent switching resolution. The novel circuitry provides a signal that is used in conjunction with the summed signal to provide automatic reset. The set point control accurately tracks the non-linear response characteristic of the sensing means such as thermocouples to provide a virtually errorless set point control signal to the summing circuit. A second set point control signal controls processes such as cooling, in addition to heating.

26 Claims, 10 Drawing Figures

CONTROLLER CIRCUIT

This application is a continuation in part of the earlier filed patent application entitled "CONTROLLER CIRCUIT" Ser. No. 249,287 now U.S. Pat. No. 3,777,187 filed on May 1, 1972, and assigned to assignee of this application.

This invention relates to controller circuitry, and more particularly, to controller circuitry adapted for providing control signals in response to parameters at remote locations falling above or below certain predetermined values.

In the past controller circuitry has operated to actuate output devices such as heaters, for example, in response to a plurality of signals. For example, there is a basic error signal which represents the difference between process parameter setting and the actual operating point of the process.

There are also control signals, such as the set point signal of the controller, that is, the signal that indicates to the controller the point at which the process is to operate. The set point signal generating circuit should operate along the characteristic curve of the sensing device used.

There is also a reset signal. The offset of a controller represents the deviation from the set point at which the system stabilizes. The offset is a function of the proportional band width over which the controller operates. It has been found desirable to minimize the offset by providing a reset signal.

Another problem encountered with presently available controllers is that there is a long time delay between the change in temperature and the corrective response. This, of course, results in poor temperature control. The long response, or lag, can cause instability in the system.

The entire controller operates through a driver and switching circuit. The switching ideally should occur at full cycle operation, with zero cross over detection high switching resolution and versatility with respect to size of and phase of load. It should be capable of driving inductive loads or triggering solid state switching devices. Since temperature controllers for many processes require cooling control in addition to heating control, a complete temperature controller should include means for controlling cooling that includes adjusting the heating and cooling band relationship as well as the respective pulse rates and widths.

Accordingly, an object of the present invention is to add the error signals and control signals after amplification to minimize noise problems with these signals.

A related object of this invention is to provide means for controlling an offset signal either manually or automatically. A further object of the present invention is to provide rate function control to overcome lag problems.

Still another object of the present invention is to provide a unique set point control circuit that provides for adjustment along the characteristic curve of the sensing device.

Yet another object of the invention is to provide a solid state driver and relay circuit.

Yet another object of the present invention is to provide a dual set point control circuit including pulse cooling means for controlling and adjusting heating and cooling band relationships as well as the respective pulse rates.

The above enumerated and other object and features of the present invention together with the manner of obtaining them will become more apparent, and the invention itself will be best understood by making reference to the following description of a preferred embodiment of the invention taken in conjunction with the accompanying drawings, in which.

Figure 1:
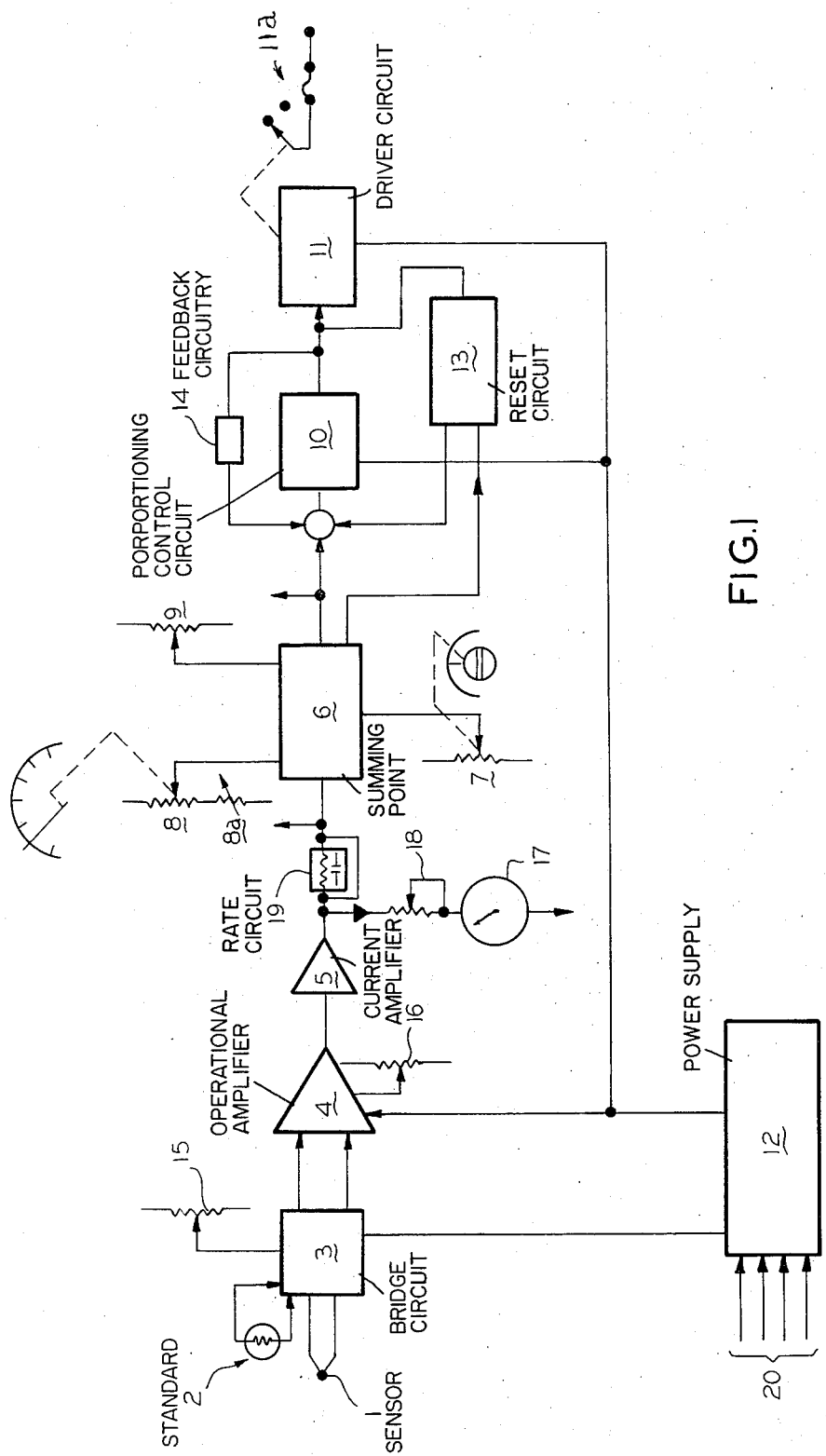
FIG. 1 shows, in block diagram form, a unique three mode controller.

The block diagram of FIG. 1 shows, generally, the circuits that are used in a controller, such as one having a temperature control function. The controller includes a basic sensor unit, in this case shown as a hot junction thermocouple 1. The thermocouple is compared with some standard in this case, the cool junction compensator 2. A signal treatment means 3, such as a bridge circuit, is provided to generate "error" signals responsive to the differences between the signals generated by the compensated hot junction thermocouple and a desired parameter, such as temperature. The error signal is fed into an operational amplifier 4 which provides, at its output, the amplified difference between the sensed signals and a biased point. The error signal output of the operational amplifier is further amplified by a current amplifier 5 whose output is fed into a signal summing point 6.

At the summing point the error signal and various signals are summed. Among the signals shown being fed into the signal summing point are a set point signal, a controller zero adjust signal and a reset, or offset, corrector signal.

More particularly, a potentiometer schematically shown at 7 is used to provide a reset signal to correct the offset reading, i.e., the reading between the set point and the stable point achieved by the controller. While this is pictorially shown as a manually adjusted potentiometer, automatic reset circuitry may be provided as described further herein.

The set point control signal is shown as being obtained from the potentiometer schematically shown as 8 in a series with a set point span adjust potentiometer 8a. The scale and dashed line coupling between the potentiometer 8 indicates that the set point is usually visually shown. It should be understood that the potentiometer shown is illustrative only. For example, in the details described further herein a digital switch is used in conjunction with constant current generating circuitry to supply the set point signal.

A controller zero adjust potentiometer is shown schematically at 9. This is also merely an illustrative showing. Other control signals may also be included at this point.

The output of the summing point 6 is fed into a proportioning or on-off control circuit indicated at 10. The output of the proportioning, or on-off control circuit, controls the relay and driver circuits 11 which controls the actual process.

Means, such as power supply 12 are provided for rectifying alternating current to supply the necessary voltages to the controller, relays and solenoids.

An automatic reset and lockout circuit 13 is shown for acting in combination with the proportioning circuit 10. The automatic reset and lockout circuit 13 is operated responsive to signal feedback from the output of circuit 10 and a signal from summing point 6. The output of reset circuit 13 acts, at the input of circuit 10, to automatically overcome the offset from the set point.

The block 14 indicates feedback circuitry used with the proportioning control circuit 10. Various other controls are shown. For example, a zero adjust for the error signal is shown schematically as potentiometer 15. A gain adjust for the operational amplifier 4 is shown as potentiometer 16. A meter 17 is shown connected to the output of the current amplifier 5 through a meter adjust potentiometer 18. A rate circuit, schematically shown as 19, which may be inserted between the amplifier 5 and the summing point 6, is shown. The rate circuit is used to compensate for lag in the process portion of the loop having the controller. The DC power supply 12 is shown as supplied with various alternating current inputs lumped together at 20. The driver 11 is shown schematically as operating switching contacts 11a and operating through a fused power input point.

It should be understood that the thermocouple of FIG. 1 could also be sensing devices, such as pressure transducers, strain gage, flow meters or other physical parameter measuring devices. The meter 17 shown as a full scale actual temperature gage could also similarly be a pressure gage or physical parameter indicator.

The reference junction and bridge operation of FIG. 1 is discussed in the prior patent application entitled, "CONTROLLER CIRCUITS" filed on May 1, 1971, having Ser. No. 249,287, and assigned to the assignee of this application.

Further, it should be understood that although the signal summing point is shown as being passive, an active amplifying buffer summing circuit can be used.

The set point control shown as 8 is indicated as a simple potentiometer. However, an automatic set point control circuit is shown in detail with a novel digital switch utilizing a resistance network and constant current source. The digital switch design allows tracking the non-linear thermocouple curves with relatively small error. A solid state variation of the normally available relay and driver circuits is shown and described further herein.

Figure 2:
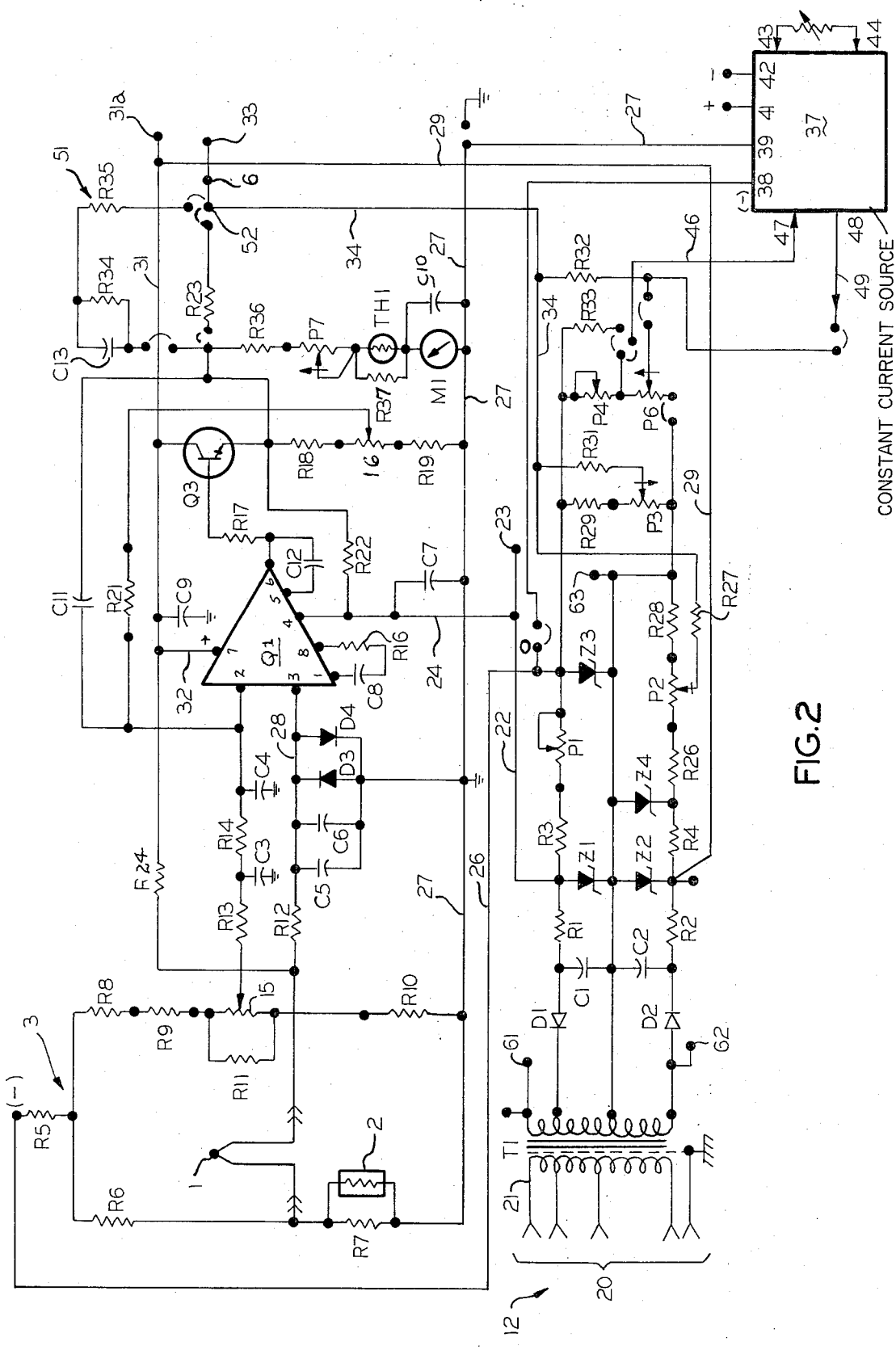
FIG. 2 is a schematic drawing of a portion of the block diagram of FIG. 1 including amplification stages and a signal summation point.

Referring now to FIG. 2, therein is schematically shown the portions of the block diagram up to and including the summing point, 6. The power supply circuit 12 of FIG. 1 is shown schematically at the bottom of the page. At the input of the power supply is an iron core transformer T1 with an electrostatic field. The primary of the transformer is shown generally at 21, having alternating current lines 20 connected to different taps thereof. The transformer secondary is shown as having a pair of half wave rectifiers connected thereto. The first half wave rectifier comprises diode D1 and storage capacitor C1. A dropping resistor R1 couples the half wave rectifier D1 to a zener diode regulator Z1 which is connected from the dropping resistor R1 to the center tap of the secondary of transformer T1.

The second half wave rectifier circuit comprises opposite going diode D2 which feeds into capacitor C2. The dropping resistor R2 couples the stored voltage in the capacitor to one side of zener regulator Z2.

Each of the zeners Z1, Z2 is bridged by another zener. For example, zener Z1 is bridged by zener 23 whose anode is connected to the anode of Z1 through dropping resistor R3 and zener current adjust rheostat P1. Similarly, Z4 is connected across Z2 with the anodes of Z2 and Z4 connected to the common tap of the secondary of the transformer T1. The cathodes of zeners Z2 and Z4 are connected together through resistor R4. A negative voltage line 22 leads from the anode of zener Z1 to output connection point 23. The negative voltage on line 22 is also connected to line 24 which leads to the negative voltage input 4 of the operational amplifier Q1. The operational amplifier Q1 is block 4 of FIG. 1.

The negative voltage at the anode of zener Z3 goes through line 26 and to the signal treatment circuit 3 in this case shown as a bridge network. The bridge network 3 includes dropping resistor R5 which leads into two sides of the bridge. Resistor R5 is connected through resistors R6 and R7 in series to common ground bus 27. Bridging resistor R7 is a cold junction compensator 2 shown as a thermistor.

The other side of the bridge network comprises the series connected resistors R8, R9, the amplifier zero adjust potentiometer 15, and resistor R10 connected to ground bus 27. The zero adjust potentiometer is bridged by resistor R11.

The "error" signal generated by thermocouple 1 is attached to the non-inverting input 3 of the operational amplifier Q1 through dropping resistor R12. The wiper of potentiometer 15 is coupled to the inverting input 2 of operational amplifier Q1 through dropping resistor R13, and a frequency by-pass circuit comprising resistor R14 bridged at either end by capacitors C3 and C4 coupled to ground, for filtering out unwanted alternating current signals.

A pair of limiter diodes D3 and D4 are provided at the inverting input of operational amplifier Q1 to assure that the input is within prescribed limits. In addition, filter capacitors C5, C6 are provided to by-pass input 3 to ground.

A by-pass capacitor C7 serves as a low impedance path to ground for alternating current for decoupling purposes. A stabilizing RC network comprising the series connection of capacitor C8 and resistor R16 is connected between inputs 1 and 8 of operational amplifier Q1 for stabilization purposes. The operational amplifier may be a type 709 operational amplifier commercially available from companies, such as Fairchild Camera and Instrument Company.

Positive voltage is coupled from the cathode of zener diode Z2 over lines 29 and 31 to input 7, the positive voltage input of operational amplifier Q1. Capacitor C9 coupled between line 31 and ground serves as a low impedance path for decoupling alternating current.

Means are provided for further amplifying the error signal output of amplifier Q1. More particularly, the output 6 of operational amplifier Q1 is connected through resistor R17 to the base of current amplifying means such as transistor Q3. (Represented as block 5 of FIG. 1) The transistor Q3 is shown as an NPN transistor with its collector connected directly to positive voltage line 31. Negative voltage is connected to the emitter from line 24 through resistor R22. The junction point of the emitter and resistor R22 is connected to ground bus 27 through the series circuit resistor R18, potentiometer 16 is in the negative feedback circuit of operational amplifier Q1. More particularly, the wiper of potentiometer 16 is connected through resistor R21 to the inverting input of operational amplifier Q1.

High frequency negative feedback used to further diminish any high frequency input to the inverting input of amplifier Q2 is derived from the junction of the emitter Q3 and resistor R18 through feedback capacitor C11 to input 2.

When the error signal input at 3 becomes more positive than the signal at input 2 the resultant output becomes more positive. The output at 6 is fed to the base of transistor Q3 through resistor R17. Transistor Q3 acts as an emitter follower stage to amplify the current and act as an impedance transformation stage. The voltage at resistor R18 is fed through resistor R23 to the summation point 6 coupled to output terminal 33. Thus, the output of the current amplifier presents the error voltage at summation point 6.

A frequency compensation capacitor C12 is provided between the output pin 6 and pin 5 of operational amplifier Q1.

Safety means, such as high impedance resistor R24, is used for applying positive voltage from the cathode of zener Z2 to the non-inverting input of amplifier Q1 to act if either of the leads from the thermocouples should break. Thus, resistor R24 is connected from the positive voltage bus 31 to the junction of thermocouple 1 and through dropping resistor R12 to input 3.

Means are provided for varying the controller signal zero point to accurately set the zero point. More particularly, potentiometer P2 is connected through a resistor R26 to the positive regulated voltage at the cathode of zener diode Z4, and through a resistor R28 to the anode of zener Z4. The wiper of the potentiometer P2 passes through resistor R27, lead 34 to the summation point 6 proximate to the output terminal 33. Means such as potentiometer P3 is used to correct the offset caused by the difference between the set point and the stable point actually obtained by the controller. Potentiometer P3 is coupled in series with resistor R29 across zener Z3. The wiper of potentiometer P3 connects the reset signal through resistor R31 to line 34 and summation point 6. The reset signal means may be automatically obtained using block 13 of FIG. 1. Means are provided for obtaining a set signal to set the controller to a desired point. Paralleling resistors R29 and potentiometer P3 is rheostat P4 in series with potentiometer P6. The wiper of potentiometer P6 is connected through resistor R32 to bus line 34 and summation point 6. The P4 rheostat having resistor R33 thereacross adjusts the span of the set point and thereby is part of the set point control signal connected to the signal summing point. The controller may utilize the potentiometer for the set point control. Alternatively, the set point signal may be obtained using more accurate means.

More accurate set point control means are provided when the set point is varied along a characteristic curve of the sensor, in this case, the thermocouple. Means, such as constant current source will fail safe digital switch shown in block 37, may be provided. When block 37 is provided, then the upwardly curved line at the set point controls are connected; otherwise the downwardly curved lines are connected. For example, input 38 of block 37 is connected to the anode of zener Z3 to provide a specific negative potential at point 38. Similarly, ground is provided where common ground bus 27 is connected to input 39. Positive and negative direct current voltages are connected at inputs 41 and 42 of block 37, respectively.

Means, such as a unique, digit controlled switch, is schematically shown as connected at input 43 and 44 to create the thermocouple characteristics. Rheostat P4 is connected through the upward curving line and lead 46 to input 47. Similarly, the output of block 37 is connected through its output 48 and line 49 through resistor R32 and line 34 to summation point 6.

The constant current and digital switch of block 37 allows digital tracking of non-linear thermocouple curves with minimal error.

Thus, FIG. 2 shows how the error signal and various control signals are summed after amplification of the error signals so as to minimize noise problems caused by noise at low levels of summation.

A further refinement shown in FIG. 2 is the rate circuit 51 which may be connected in place of resistor R23 at the output of the current amplifier Q3. The rate circuit is connected so that the output of the current amplifier transistor Q3 is differentiated by the differentiating circuit which includes capacitor C13 bridged by resistor R35. Resistor R35 is connected at its other side to the point 52 leading to summation point 6. The other side of the junction of capacitor C13 and resistor R34 is connected to the top of the resistor R18, that is, the junction of the emitter of transistor Q3 and resistor R18.

Means are provided for showing the actual output of the current amplifier in terms of a full scale temperature reading. More particularly, a meter M1 is coupled between ground and a thermistor TH1 in series with rheostat P7 and resistor R36 to the junction of the emitter of transistor Q3 and resistor R18. Rheostat P7 is the full scale adjustment for meter M1. The thermistor TH1 provides a correction for the errors induced by the heating of the coil of meter M1. The thermistor TH1 is paralleled by a resistor R37. The meter is paralleled by capacitor C10 which acts to slow the meter response.

Figure 3:
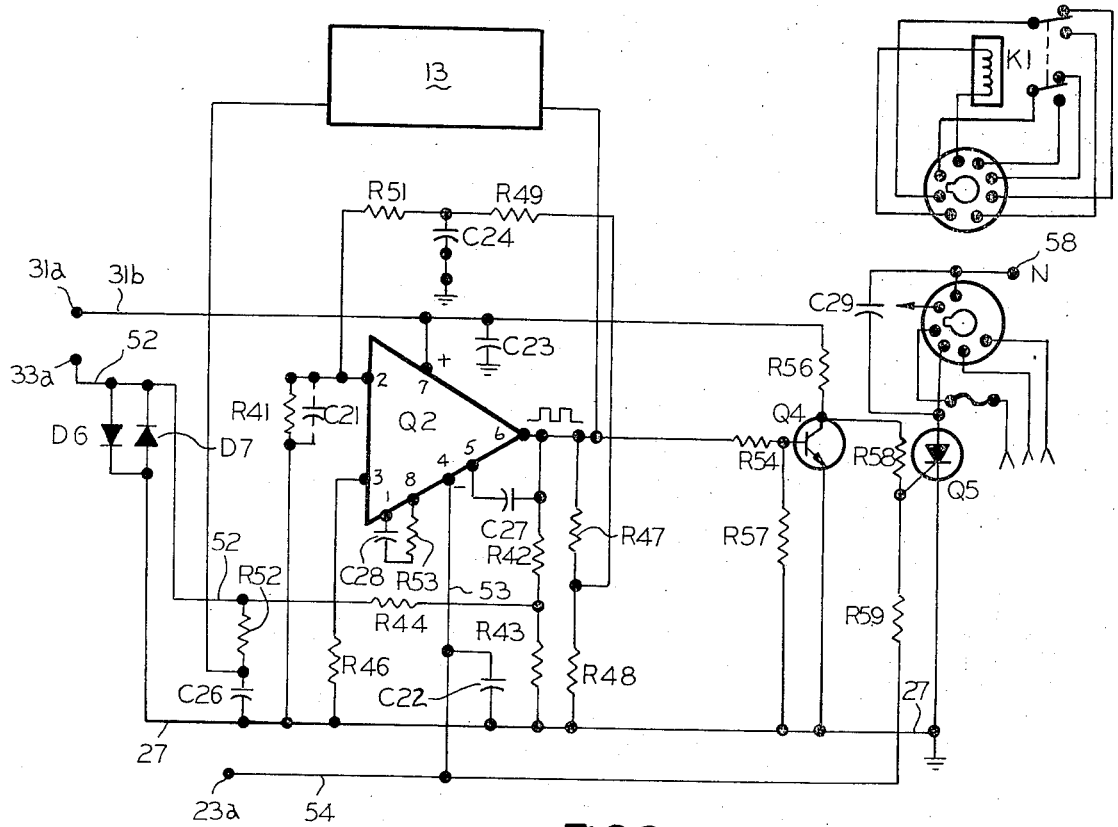
FIG. 3 is a schematic showing of the output portion of the controller of FIG. 1 utilizing proportioning control.

FIG. 3 is the schematic showing of blocks 10 and 11 of FIG. 1. More particularly, FIG. 3 shows a point 31a connected to point 31 of FIG. 2 which is the positive supply voltage received from the power supply. Point 31a is coupled directly into input point 7 of the operational amplifier Q2. Operational amplifier Q2 may be a 709 type operational amplifier commercially available from companies such as Fairchild Camera.

The circuitry connected with operational amplifier Q2 provides for a proportioning control. The signal of the summation point 6 is transmitted through terminal 33a, line 52, past the limiting network provided by a pair of opposite going diodes D7 and D6 to the non-inverting input of operational amplifier Q2.

The inverting input 2 of block 10, i.e., the proportional control circuit of operational amplifier Q2 is coupled to ground bus 27 through resistor R41 bridged by by-pass capacitor C21.

Negative bias voltage is brought into printed circuit board circuit Q2 at its pin 4 through line 53, line 54, terminal 33a coupled to junction 23 of the power supply shown in FIG. 2. A decoupling capacitor C22 is connected from line 53 to ground bus 27, to filter the negative voltages. Similarly, the positive line connected to junction 31a and is decoupled by capacitor C23 connected to ground.

The output point 6 of circuit Q2 goes through a voltage divider comprising resistors R42 and R43 in series connected to ground bus 27. The junction point of resistors R42 and R43 is fed back to the non-inverting input 3 through a resistor R44. This circuitry provides positive feedback from the output to the input of amplifier Q2.

A second voltage divider at the output of circuit Q2 is comprised of resistors R47 and R48 in series from the output 6 to ground. The junction point of resistors R47 and R48 is coupled back to the input through a timing network comprising resistors R49 and R51 in series with the junction points of resistors R49 and R51 connected to ground by timing capacitor C24. The operational amplifier Q2 is connected as as astable voltage controlled oscillator. The timing circuitry establishes the basic period of oscillation along with the positive feedback components. The output of amplifier Q2 is a square wave, as shown.

Automatic reset circuit 13 is shown connected between output 6 to input 3 through resistor R52. The junction point of the automatic reset circuit 13 and resistor R52 is connected to ground through by-pass capacitor C26. The operation of the automatic reset will be discussed later herein.

The circuit Q2 has another frequency compensation capacitor C27 going from its pin 5 to its output and another series resistance network comprising capacitor C28 and resistor R53 going from pin 1 to pin 8.

The square wave output of circuit Q2 is used to control a transistorized driver circuit including inverter transistor Q4. The circuitry associated with transistor Q4 (and onward) represents block 11 of FIG. 1.

The base of transistor Q4 is connected to the output 6 of the circuit Q2 at the coupling point of a voltage divider network comprising resistors R54, R57 connected between the output of circuit Q2 and ground. The collector of the transistor Q4 is connected to the positive bus 31b through resistor R56. The emitter of transistor Q4 is connected directly to the ground bus 27.

When the output of circuit Q2 is negative, then inverter transistor Q4 switches to its non-conducting condition, at which time constant flows from the positive bus 31b through resistor R56, R58 and through the impedance of Q5 to ground. Resistor R59 is a bias resistor.

When transistor Q4 is in its non-conducting condition, then sufficient current flows through resistors R56, R58 and the gate so that SCR Q5 conducts. However, when transistor Q4 conducts, it effectively shorts out resistor R58 so that the gate of SCR Q5 goes slightly negative due to the bias of resistor R59 and prevents the SCR from conducting during the next half cycle of the power supply. The current flowing through the SCR completes a path going from an alternating current source at input 58 through the coil of a relay K1 to the SCR Q5 to ground bus 27. Various circuitry associated with the relay coil K1 may have many variations. For example, capacitor C29 may be used to prevent chattering. Similarly, other well known circuitry may be used in connection with the relay.

In operation the circuitry of FIG. 3 received the sum of the control signals and error signals at junction 33a. The amplitude of the combined signals is limited by the limiter network and is transmitted to the non-inverting input 3 of the operational amplifier Q2. Positive and negative feedbacks are furnished. Positive feedback is connected to the non-inverting input 3 through resistors R42 and R44, and over resistor R46. The operational amplifier Q2 forms an astable multi-vibrator providing a square wave output. The value of the voltage across resistor R46 is selected to adjust the duty cycle to a desired level (usually 50 percent) when the sensed temperature equals the set point temperature.

When the sum of the error and the set point signal equals zero plus or minus the necessary control signals, i.e., the zero correct and the reset signals then the voltage level at 33a provides the desired duty cycle, usually 50 percent. When the voltage level at terminal 33a is more positive, the negative and positive feedback circuits cause the operational amplifier Q2 output to provide longer positive pulses than negative pulses. Below the proportioning band the signal output at terminal 6 is always negative whereas above the proportioning band the signal output at terminal 6 is always positive. Within the proportional band the output signal of terminal 6 is asymmetrical and has a negative value of longer duration than its positive voltage value, near the lower band edge and has a positive value of longer duration near the upper band edge. The square wave thus produced causes the relay K1 to operate so as to execute a control function in a proportioning way, being closed for a greater or lesser amount of time during each cycle as required.

Thus, when the temperature is outside the proportional band width, the duty cycle of the output signal of circuit Q2 is shifted to its maximum extent, that is, to either 0 or 100 percent. When the temperature comes within the proportional band width, the duty cycle is shifted and eventually a stable condition is reached when the desired temperature is approximately the temperature set by the set point potentiometer.

There is, however, some residual error remaining after the controller stabilizes, and therefore, an offset correction control 7 is provided. The band width of the controller may be adjustable by inserting an attenuation network between sum junction 6 and input 33a. Decreasing the voltage level increases the band width. The cycle rate of the controller may be varied by inserting a potentiometer in series between resistors R42 and R43 with the wiper attached to R44. Alternatively the value of capacitor C24 can be changed to vary the cycle rate.

Figure 4:
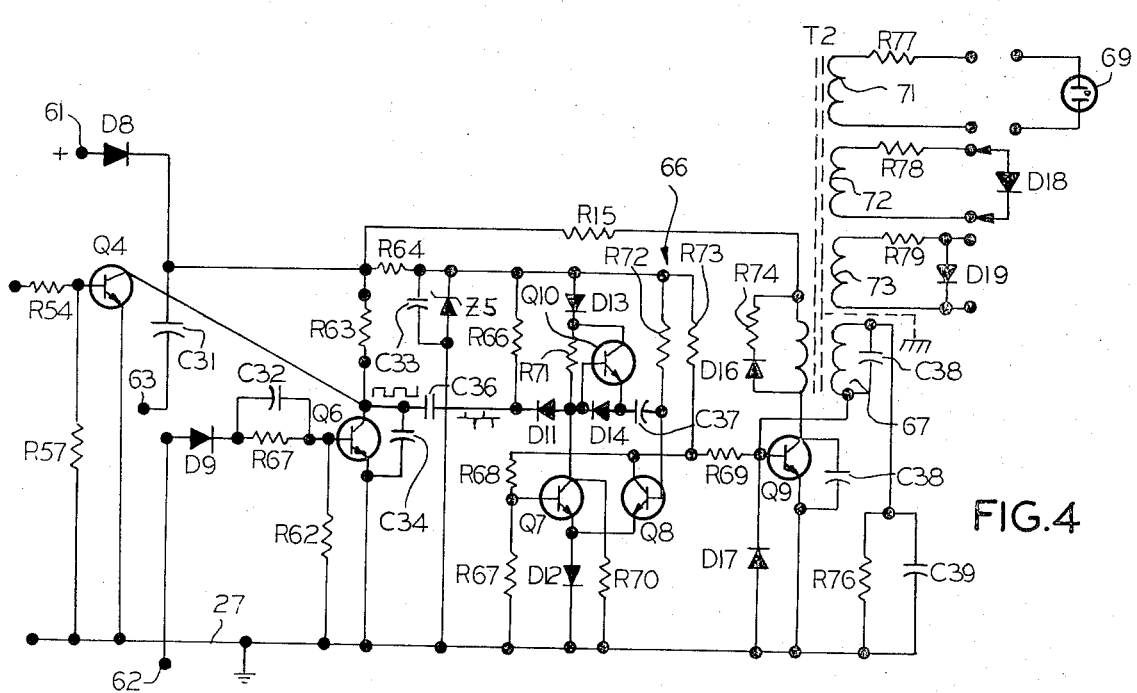
FIG. 4 is a schematic showing of a solid state relay and driver circuitry for use as block 11 of FIG. 1.

FIG. 4 schematically shows the details of block 11 of the block diagram of FIG. 1. It is a solid state power relay driver circuit. It functions in place of the driver and relay of FIG. 3, and is under the command of the voltage controlled astable multi-vibrator circuit operational amplifier Q2. However, the circuit of FIG. 4 offers zero cross-over detection and trigger, full cycle operation, operation of inductive loads, good switching resolution and power drive for triggering solid state devices such as triacs and SCR's, among other features.

The solid state relay driver circuit comprises a zero cross over detection followed by a differentiator. The differentiated signal triggers a monostable multivibrator that gates a blocking oscillator driver for a duration of slightly less than one full cycle of the power line.

It should be noted that resistor R54 which leads from output pin 6 of amplifier Q2 is shown in FIG. 4. It is attached to the base of switching transistor Q4.

A synchronizing signal is obtained from terminal 62 at the other side of the transformer T1 secondary. The synchronizing signal is rectified by diode D9 and connected to the base of transistor Q6 through a phase shift network comprising resistor R67 in parallel with capacitor C32. The transistor Q6 acts as a zero cross over detector and provides a square wave that is of a slightly shorter duration than the half (½) cycle of the synchronizing signal. In this case, the leading edge of the square wave is used as the zero sync signal.

Direct current voltage is provided for the entire circuit. More particularly, alternating current is supplied at terminal 61 to a rectifying diode D8. The rectified positive half wave voltage is fed into filter storage capacitor C31. The other side of the storage capacitor C31 is coupled through terminal 63 to a mid-tap on the secondary of transformer T1 in FIG. 2 of the alternating current supply. The junction of the diode D8 and capacitor C31 is coupled through dropping resistor R15 to the primary coil of the blocking oscillator transformer and through dropping resistor R64 to the cathode of a regulating zener diode Z5. The anode of the zener is grounded. A capacitor C33 provides a low alternating current impedance path to ground.

Transistor Q4 in conjunction with transistor Q6 forms an AND gate. No sync information is available at the output of transistor Q6 if transistor Q4 is conducting. The collector of transistor Q4 is tied directly to the collector of transistor Q6 to short the output of transistor Q6 to ground when when transistor Q4 conducts.

The collector of transistor Q6 is coupled to the positive direct current through a load resistor R63. The base is coupled to ground through biasing resistor R62 and the emitter is grounded. A transient by-pass capacitor C34 is connected between the emitter and the collector of the transistor Q6.

The square wave output is differentiated by capacitor C36 and feeds the junction of negative poled diode D11 and resistor R36. Resistor R36 is connected to positive voltage at the cathode of zener Z5 to provide biasing for the diode.

The negative spikes trigger the monostable multivibrator which is comprised of transistors Q7 and Q8 with transistor Q10 providing a fast recovery to the timing capacitor C37. The time constants for the period of the one shot is provided by resistor R72 and capacitor C37 connected between the positive voltage source and the emitter of transistor Q10. The junction of resistor R72 and the capacitor C37 is connected to the base of transistor Q8. The emitters of transistors Q7 and Q8 are grounded through diode D12. The base of transistor Q7 is coupled to the collector of transistor Q8 through resistor R68. The junction of the base of transistor Q7 and resistor R68 is tied to ground through resistor R67.

The collector of transistor Q7 is coupled to positive voltage through diode D13 and resistor R71. The junction of resistor R71 and the collector of transistor Q7 is tied to the anode of diode D11. The anode of diode D11 is also connected to the base of transistor Q10 and the cathode of diode D14. The anode of diode D14 is tied to the emitter of transistor Q10. Diode D13 provides noise immunity.

The blocking oscillator Q9 provides a wave train of drive pulses during the period of the one shot, or monostable oscillator. The transistor Q9 has its collector connected to the primary winding of a transformer T2. The other side of the primary winding is connected to the positive voltage source at the cathode of diode D8 through the resistor R15.

A suppressing circuit is provided comprising diode D16 in series with resistor R74 connected across the primary winding.

A by-pass capacitor C38 connects the collector of transistor Q9 to ground. The base of transistor Q9 is connected to ground through a protective diode D17 which is oriented to by-pass negative pulses to protect transistor Q9.

The feedback winding 67 is bridged by capacitor C38 and the other side of the winding is connected to ground through resistor capacitor parallel combination resonant network including resistor R76 and capacitor C39.

The secondary of transformer T2 has a plurality of windings. The topmost winding is shown simply as the lamp source. There is schematically shown a neon lamp 69 capable of being connected to winding 71 through series dropping resistor R77. A second winding 72 is shown as being extended to terminals through a dropping resistor R78. There is 9 diode D18 shown which can be selectively connected to the terminal if the winding 72 is used for driving silicone controlled recitfiers. Without the diode, the winding can be used to drive triacs.

Winding 73 is shown as equipped with a fixed diode D19 and dropping resistor R79 so that a winding 73 is used for driving SCR's. The removal of diode D19 would enable driving additional triacs.

Thus, the driver circuit of FIG. 4 operates to produce a wave train of trigger pulses for approximately the full power line cycle. It is capable of operation with inductive and resistive loads. The recovery circuit enables good switching resolution. Either triacs or SCR's can be driven at its output.

The automatic reset circuit shown as block 13 automatically provides reset and lockout. It effectively replaces the manual offset control shown at 7 in the block diagram of FIG. 1. In general, it operates by introducing an integral voltage that is proportionate to the power ratio of the output cycle. The reset signal, however, is in opposition to the polarity of the error signal. Thus, the result is that the process measured or sensed characteristic, such as temperature, is brought into agreement with the set point characteristic after some preselected time period.

The lockout feature is accomplished using a window detector and a clamping circuit. The lockout of the automatic reset is provided slightly below and slightly above the proportioning band. This lockout acts to prevent reset windup or instability.

The automatic reset and lockout circuits 13 derive their reset signal from the proportioning control circuit of block 10. It also obtains a signal from the summing points 6 that trigger the lockout amplifiers.

Figure 5:
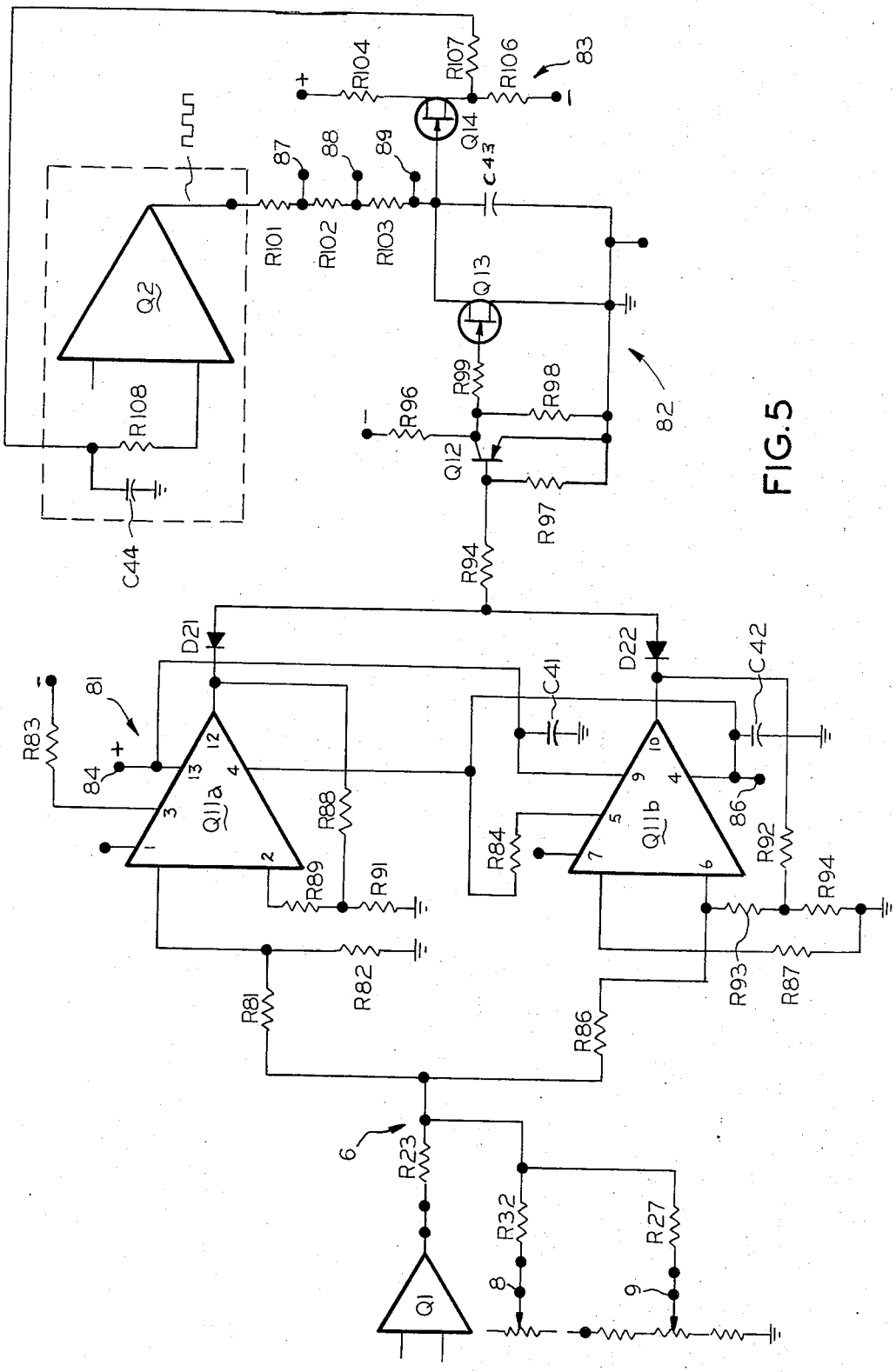
FIG. 5 is a schematic showing of the automatic reset circuit of block 13 of FIG. 1 and FIG. 3.

In detail, then, FIG. 5 shows the necessary portions of FIG. 2 and FIG. 3. The portion of FIG. 2 that is shown includes the summation point indicated by the arrow 6 leading from the operational amplifier Q1, the set point control 8 and the zero control 9. There is no offset control, naturally, since that is what the following circuitry automatically provides. The resistor shown at the output of Q1 is resistor R23. The resistor leading from the set point control is resistor R32. The resistor leading from the zero control is resistor R27. While not shown in FIG. 5, summing means are also provided to connect the output of Q1 to the input of operational amplifier Q2. Operational amplifier Q2 is shown at the top right hand portion of the drawing.

Timing means are provided at the output of operational amplifier Q2. More particularly, the output is fed through a series of resistors and a capacitor to ground. Taps 87, 88 and 89 are provided for selectively shorting out resistors to vary the time constant of the RC network. The time is selected for that amount required for stability.

The circuitry of FIG. 5 automatically corrects for any offset between the desired set point and the actual stable point provided by the controller.

The window detectors comprise a dual operational amplifier shown as Q11a and Q11b. The purpose of the two amplifier circuits is to detect when the error voltage indicates parameters slightly above the proportional band and slightly below the proportional band. When the signal is slightly above or below the proportional band, then the reset is disabled to prevent reset windup or instability. Thus, the circuit can be broken into three different sections. Section 81 is the window detector. Section 82 is the disabling section for disabling the automatic reset function within the proportional band. Finally, there is the reset section 83. The detector section and the disabling section together constitute the lockout section.

The window detectors 81 being at point 6 which is connected through a voltage divider comprising resistors R81 and R82 to ground. The junction point of resistors R81 and R82 is coupled to the inverting input of operational amplifier Q11A.

Negative voltage is connected to input 3 of amplifier Q11A through resistor R83 which is selected so that the upper edge of the "window" is slightly higher than the upper limit of the proportional band.

Positive voltage is connected from terminal 84 to positive voltage input 13 on operational amplifier Q11A. The operational amplifier, incidently, is a 747 type amplifier such as that supplied by, among other companies, Fairchild Camera.

The negative voltage is also applied from terminal 86 directly to input 4 of the operational amplifier Q11A and Q11B. The positive voltage from terminal 84 also is fed into input 9 of operational amplifier Q11B. The positive voltage is filtered by a by-pass capacitor C41. Similarly, the negative voltage is also filtered by a by-pass capacitor C42 connected between negative voltage terminal and ground. The negative voltage also goes through a resistor R84 to input 5 of amplifier Q11B. The value of resistor R84 is selected to adjust the lower edge of the window to be slightly lower than the lower edge of the proportional band.

A resistor R86 couples point 6 to the non-inverting input 6 of Q11B. The inverting input 7 of Q11B is connected to ground through resistor R87.

Both operational amplifiers Q11A and Q11B include positive feedback circuits for adding hysteresis to reduce instability caused by noise and transients. More particularly, the output at 12 of amplifier Q11A passes through resistors R88 and R89 to the non-inverting input of amplifier Q11A. The junction of resistors R88 and R89 is connected to ground through resistor R91.

Similarly, a stabilizing feedback is provided for circuit Q11B, when its output 10 is connected through resistors R92 and R93 in series to the non-inverting input 6. Here again, the junction of resistors R92 and R93 is connected to ground through resistors R94. Assuming that the error voltage is positive at 6, then the positive voltage will pass through both resistors R81 and R86 to the inverting and non-inverting inputs of circuits Q11A and Q11B, respectively.

The positive voltage connected at input 1 of amplifier Q11A becomes negative at the output 12 and passes through a diode D21 and resistor R94 to the base of a transistor Q12 in lockout circuit 82. Transistor Q12 is a PNP transistor which is used to control a field effect switching transistor Q13. When the error signal at point 6 is negative, then the voltage that passes through resistor R86 to the non-inverting point 6 remains negative at the output 10 of circuit Q11B. This negative signal then passes through resistor R94 to the base of PNP transistor Q12.

The positive voltage going through circuit Q11B comes out positive and is stopped by blocking diode D22. The negative voltage that passes through resistor R81 to input 1 of the circuit Q11A comes out positive and is blocked by the blocking diode D21. By the proper selection of resistors R83 and R84 there is no output at all from circuits Q11A or Q11B unless the error signal at point 6 is slightly higher than the upper edge of the proportioning band. Similarly, there is no output from circuit Q11B unless the error signal at point 6 is slightly lower than the lower edge of the proportioning band. When there is no signal applied at resistor R94, transistor Q12 is switched to its non-conducting condition. The transistor Q12 has negative voltage applied through resistor R96 to its collector and has its emitter connected directly to ground. Further, the resistor R97 is connected from the base of the transistor to ground.

A signal coming from either of the blocking diodes D21 or D22 passes through resistors R94 and R97 to ground. The voltage at the junction of resistors R94 and R97 is sufficient to cause the PNP transistor Q12 to conduct. With no signal from the blocking diodes D21 and D22, the transistor Q12 normally is non-conducting and its collector is effectively at negative potential. The window detector thereby operates to determine when the error signal is indicative of a temperature either slightly above or slightly below the proportional band.

Transistor Q12 controls field effect transistor clamping device Q13. That is, when transistor Q12 is in its normally non-conducting condition, then the negative voltage at the top of resistor R96 passes through resistors R96 and R98 to ground. This puts negative voltage on the gate through resistor R99 and prevents transistor Q13 from conducting. When the transistor Q12 conducts, then the ground is applied to the gate of field effect transistor Q13 enabling it to conduct from source to drain and to thereby clamp by applying ground to discharge capacitor C42. Thus, the lockout circuit operates to disable the reset circuit.

However, when transistor Q13 is non-conducting which is indicative that the error voltage is within the proportioning range, then the reset circuit of transistor Q14 is enabled. The reset circuit comprises timing means. The timing means includes resistors R101, R102 and R103 connected in series through capacitor C43 to ground. Taps such as taps 87, 88 and 89 are provided for shorting out any of the resistors to vary the time constant of the RC circuit. The time constant in one particular embodiment could be varied between 3 minutes, 6 minutes and 10 minutes. Thus, for example, if terminals 88 and 89 are tied together and resistor R103 is shorted, then a 6 minute period of time is provided by the RC network.

The field effect transistor Q14 acts as an analog amplifier source follower to follow the voltage on capacitor C43. A positive voltage is applied to the drain of transistor Q14 through a resistor R104. A negative voltage is applied to the source through resistor R106. A feedback is applied to the non-inverting input of operational amplifier Q2 through resistors R107 and R108 in series. The resistor R108 is shown as coupled to ground through a by-pass capacitor C44. The selection of resistors R107 and R108 is used to adjust the reset gain. The amplitude of the voltage in the feedback circuitry going back into the non-inverting input of transistor Q2 may be negative or positive. Resistor R104 is selected to adjust the reset span.

The reset signal must be inverse to and proportional to the average amplitude of the duty cycle or the integral of the duty cycle. The capacitor C43 serves to integrate the output of amplifier Q2 and the analog amplifier Q14 follows the capacitor charge and transmits the requisite signal to the non-inverting input of amplifier Q2.

Figure 6:
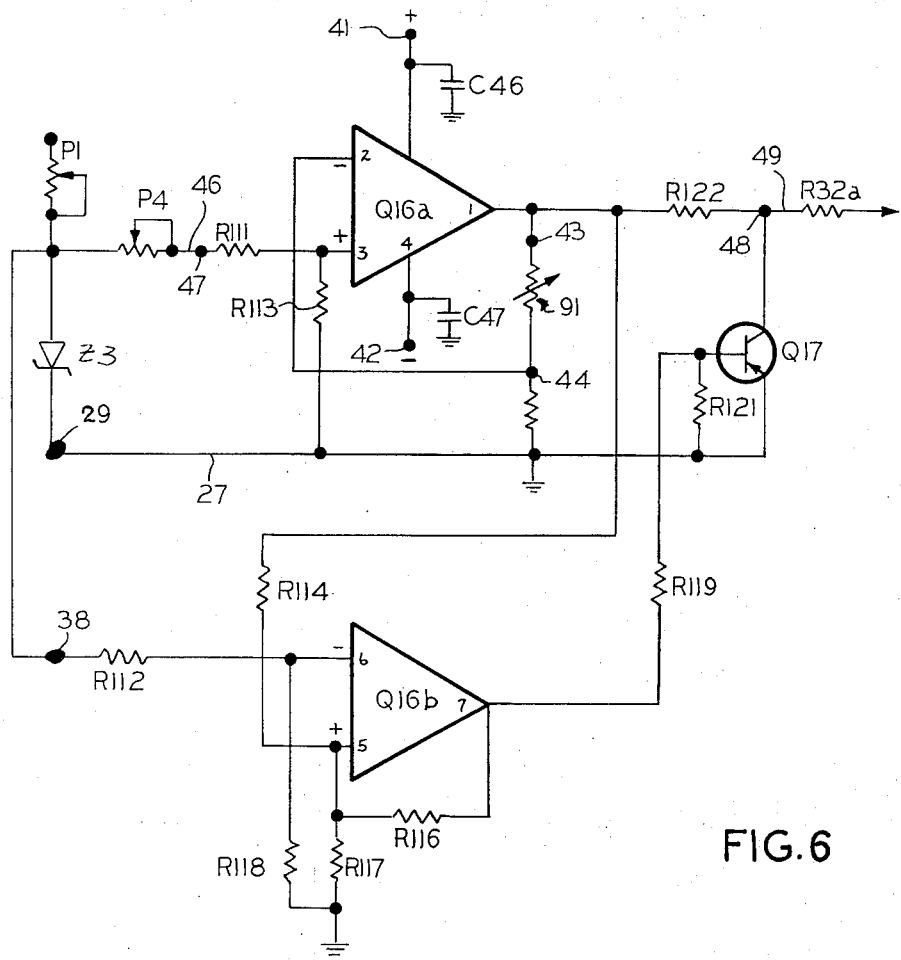
FIG. 6 is a schematic showing of set point control circuitry shown as block 37 of FIG. 2.

FIG. 6 schematically shows the novel set point signal source indicated by block 37 of FIG. 2. To orient the schematic of FIG. 6 to that of FIG. 2 certain components are included in both. For example, the zener current control potentiometer P1 is shown as well as the zener Z3. The junction of the potentiometer and the zener Z3 is connected through a rheostat P4 to a new component resistor R111. In the schematic of FIG. 2 rheostat P4 is connected to the potentiometer P6 and bridged by resistor R32. Here, it is connected through a resistor R111 to the non-inverting input of one half the operational amplifier Q16A. The other end of the zener Z3 is, of course, connected to a tap on the secondary winding of transformer T1. In this version it is shown as being grounded. The junction of rheostat P4 and resistor R111 is further shown as lead 46 corresponding to the showing of lead 46 in FIG. 2. The junction of potentiometer P1 and zener Z3 is also connected at terminal 38 and resistor R112 to the inverting input 6 of the other half of the operational amplifier Q16B. The cathode side of zener Z3 is shown as connected to ground bus 27 through terminal 29.

Positive voltage is connected at terminal 41, and negative voltage is connected at terminal 42. Both positive and negative terminals are connected to ground through by-pass capacitors C46 and C47, respectively. The digital switch is shown at 91 coupled at terminals 43 and 44. The digital switch is typically zero to 20K Ohms. Other values could, of course, be used. It is connected from the output of amplifier Q16A to its inverting input 2 at both sides of the digital switch. The terminals 43 and 44 correlate to the terminals 43 and 44 on block 37 of FIG. 2.

The resistor R111 is connected to the non-inverting input 3 of amplifier Q16A. The non-inverting input is also connected to ground through resistor R113. Thus, the voltage of zener Z3 passes through rheostat P4 and resistors R111 and R113 to ground.

Operational amplifier Q16A is connected to generate a constant current through the digital switch 91. With the current constant, the output voltage of operational amplifier Q16A becomes a function of the resistance in the digital switch at any time.

Fail safe means such as amplifier Q16B are provided in case the digital switch 91 should open. An open digital switch would mean that no feedback is going into the inverting input 2. Without the feedback, the output voltage at 1 of amplifier Q16A goes to its maximum value which represents a control point beyond the full scale value that causes the process to increase to an unsafe value that could possibly burn up the device being controlled.

The output of operational amplifier Q16A is connected through a resistor R114 to the non-inverting input 5 of circuit Q16B. When operational amplifier Q16A output is at its maximum value, or some value set above normal operations, then the output at 7 of amplifier Q16B therefore becomes a negative going signal indicating an open load. A feedback from the output of amplifier Q16B is provided through voltage divider circuit comprising resistors R116 and R117 connected from output 7 to ground. The junction point of resistors R116 and R117 is connected to the non-inverting input 5 of amplifier Q16B. When the output of operational amplifier Q16A is normal, then the zener voltage applied through terminal 38 and resistors R112 and R118 to ground provides a voltage at the junction of resistors R112 and R118 which is fed to the inverting input 6. This input inverting terminal 6 provides a positive going output signal. The output of Q16B whether positive or negative is connected through resistors R119 and R121 to ground. The junction of resistors R119 and R121 is connected with the base of a PNP transistor Q17.

When there is a normal positive going output signal from amplifier Q16B, then transistor Q17 remains in its nonconducting state. However, if switch 91 opens and there is a negative going signal at the output of operational amplifier Q16B, then the negative voltage applied to the base of transistor Q17 causes that transistor to conduct. The emitter of that transistor Q17 is coupled directly to ground while the collector of transistor Q17 is connected at the terminal 48 of the set point circuit to resistor R32a. Thus, if the switch 91 opens, the output is grounded. The grounded output, in effect, puts the set point at a zero level. With the control point at below the set point, the process normally would shut down, rendering the controller fail safe.

It should be noted that the output of circuit Q16A is connected to point 49 through a resistor R122. The usual methods setting the "set point" is to approximate the non-linear sensing device such as a thermocouple with a potentiometer, an incremental switch, or Kelvin-varlee divider. All of these devices are essentially linear. Therefore, they are applied in a way commonly referred to as the best straightline fit. The error using these best straightline fit devices leaves a lot to be desired, as is known by those skilled in the art.

Figure 7:
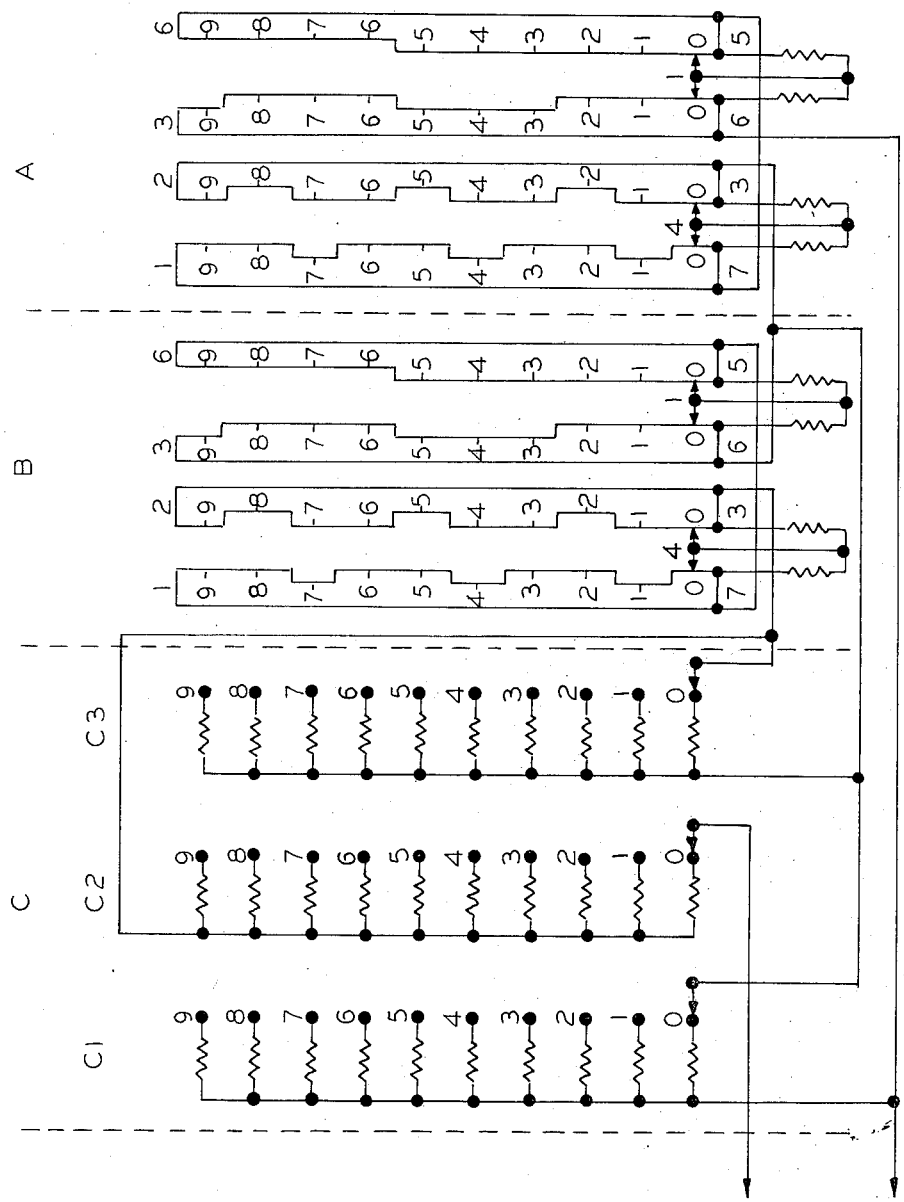
FIG. 7 through FIG. 9 are schematic showing of digital switch configurations for use with the set point circuitry of FIG. 6.
Figure 8:
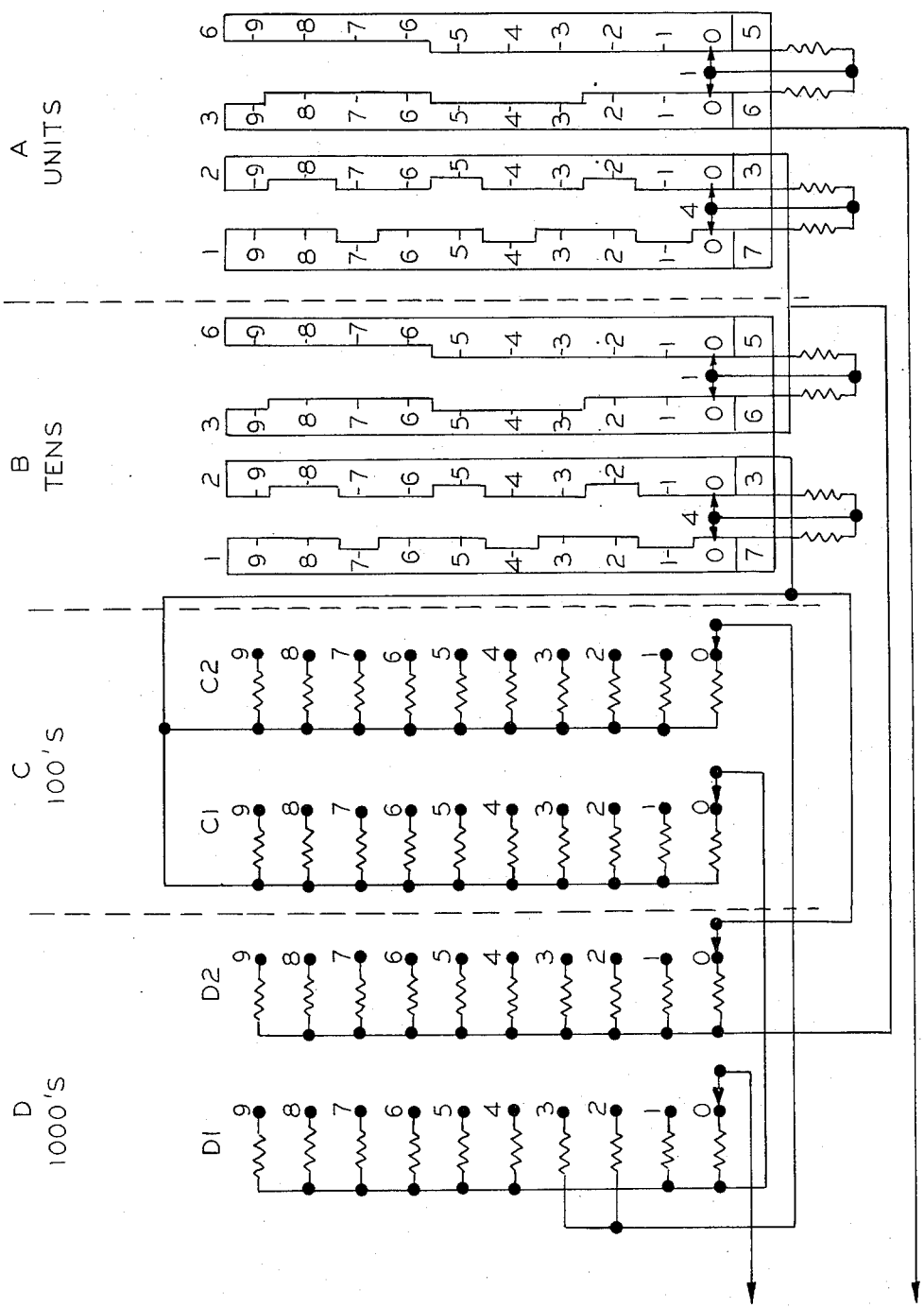
Figure 9:
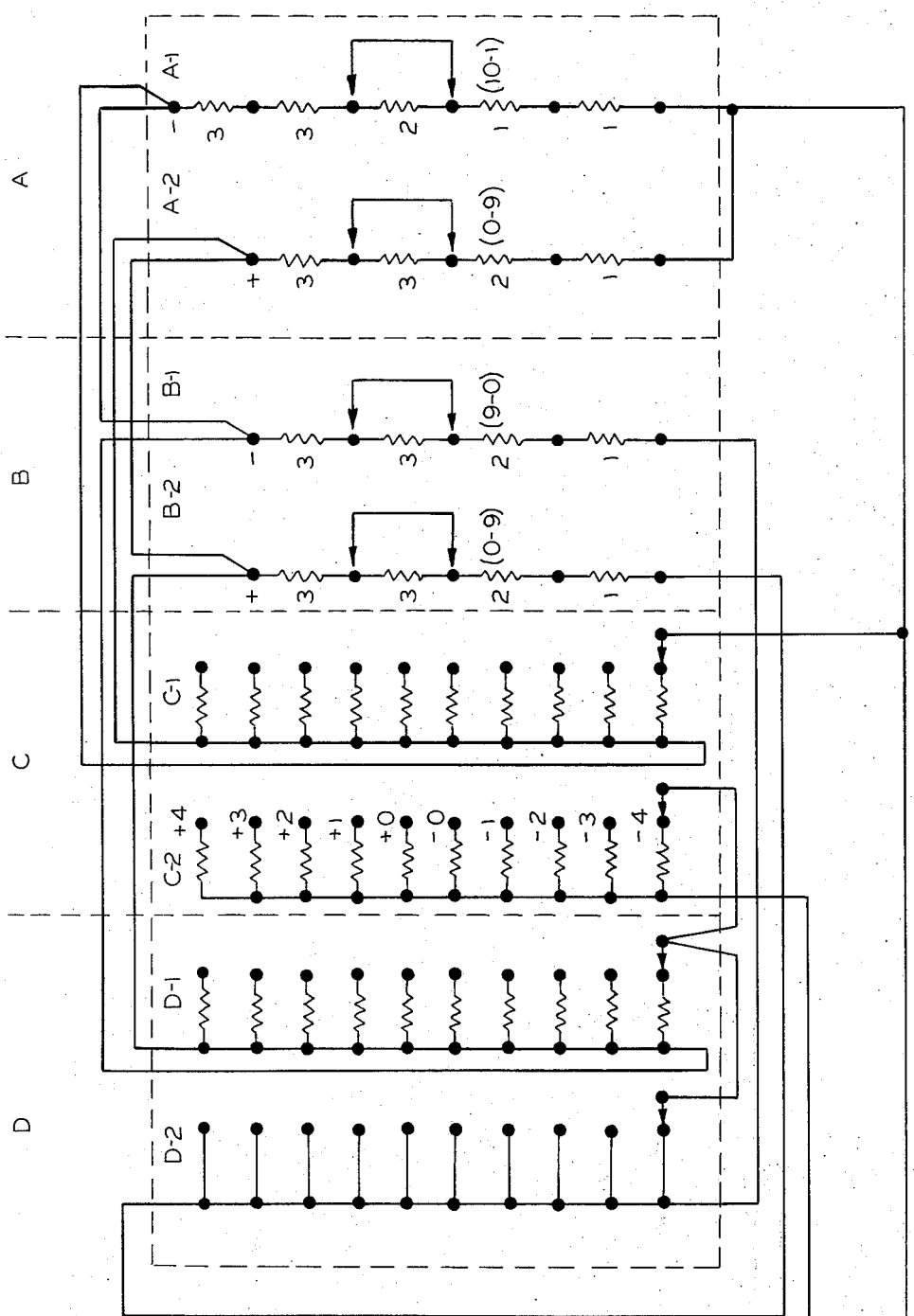

Typical digital switches such as that shown at 91, are shown in FIGS. 7 – 9. As can be seen the switches are divided into A, B, C and D sections and may be variations of a useful range of up to 0° to 4,000° F. In FIG. 7 the digital switch is wired for a 0°–999° range. The switches of sections A and B are resistance decade units having numbers 0 through 9. The switch of C is a three pole decimal switch. The switch of section C2 sets the base, that is the hundreds value, for each major increment 0 – 900. Section C3 does the shunting of section B while section C1 does the shunting of section A. Therefore, for each hundred degree increment all switches are brought to the required microvolts per degree Farenheit, or Centigrade for that segment. A variation of the switch of FIG. 7 is shown in FIG. 8 and allows a digital switch to be used over a span of greater than 100, which is not customary in low cost controllers. FIG. 8 shows a digital switch for a 0° – 4,000° range. Switch section D1 provides a cardinal point for each 1,000° increment and selects either section C1 or C2 for the hundreds increment. Switch D2 shunts switch B to the required tens increment and switch A in this case is an average value over the range.

It should be understood that the digital switch is not limited by these configurations, since three additional C decks and two additional D decks would yield a negligable inaccuracy. As shown in FIG. 8 the accuracy is within ±0.25 percent which is adequate for most applications.

It should be noted that since the controller described hereinbefore uses as its comparative signal or control points, a DC signal generated at relatively high levels which does not have to go negative, it is feasible to generate a digital set point which provides negative control points, that is, control points below zero. For example, the set point control normally is zero to +4 volts or zero to +8 volts by virtue of the output of operational amplifier Q1 going from 0 to 8 volts, regardless of whether the input is negative, suppressed or positive.

This concept is equal schematically to the configuration of FIG. 9 wherein C2 provides the cardinal 100 points, for example 0 to −400 and 0 to +400, section C1 shunts the A deck with one half shunting the positive section and the other half shunting the negative section.

The D1 section of the D deck similarly shunts the B deck. The D2 section selects the positive or the negative sections of the A and B decks. Thus, the digital switch acting across the constant current source provides the necessary set point voltage in a new and unique way. The method and equipment outlined is more accurate at the same or less cost than that previously provided by potentiometers and also enables a set point below zero.

Figure 10:
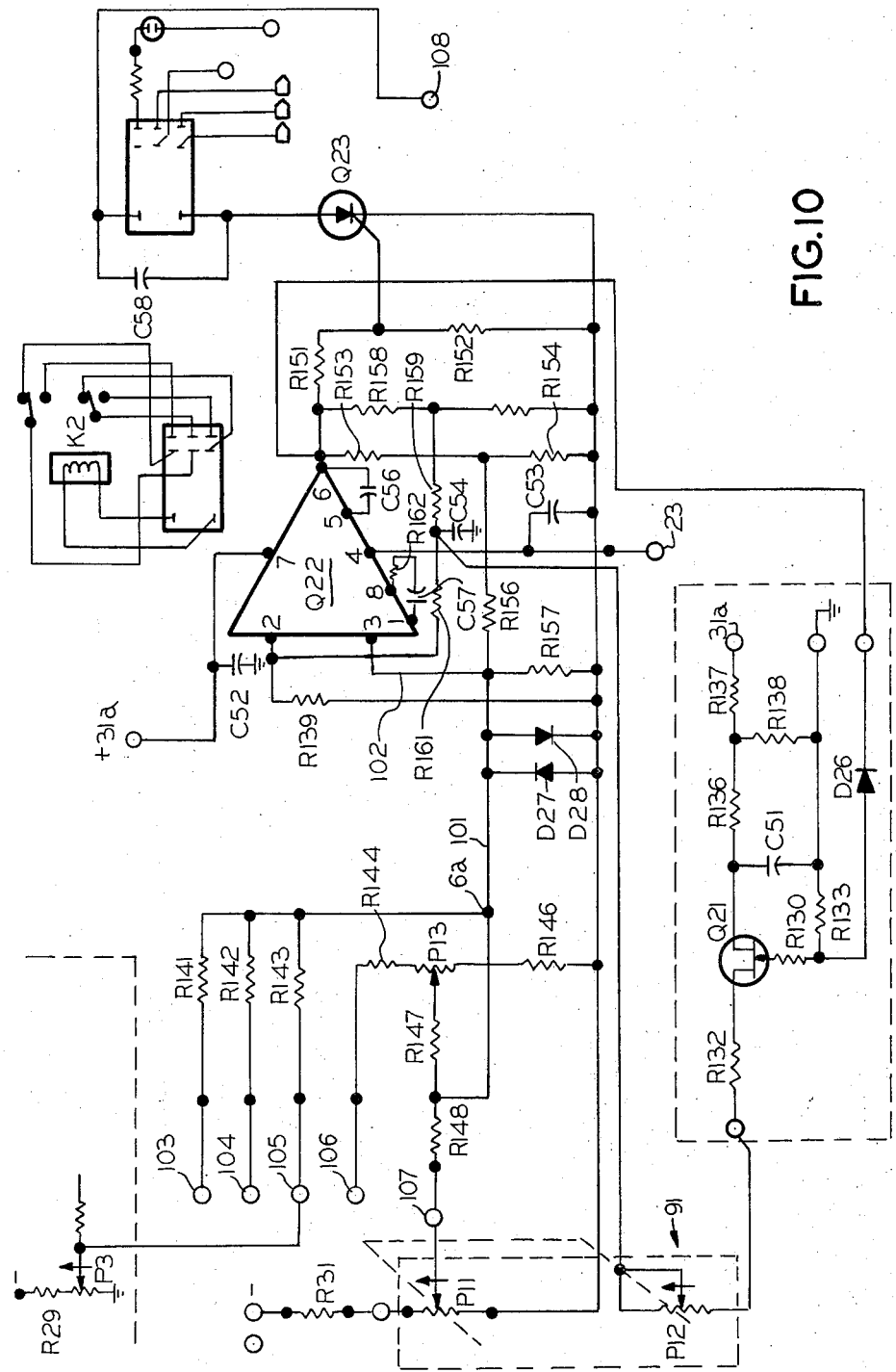
FIG. 10 is a schematic showing of circuitry used for operating dual set point controls for controlling heating and cooling processes.

Means such as shown in FIG. 10 are provided to control cooling processes as well as heating processes. For example, if the overall controller of FIG. 1 is used to control a system utilizing cooling, as well as heating, then the schematic of FIG. 10 would be included in the controller circuitry.

There are portions of FIG. 10 that are shown in the schematic of FIG. 2. For example, there is shown the manual offset control correction P3 and R29 connected between the negative voltage and ground.

A second set point control is shown within the dashed lines 91. It is connected from the negative voltage at point 0 to be found at the anode of the zener Z3 of FIG. 2. A resistor R131 leads to the second set point potentiometer P11, which is mechanically coupled to a second potentiometer P12. The second potentiometer is connected through a resistor R132 to the drain of a field effect transistor Q21. The source of transistor Q21 is connected to the gate through capacitor C51, resistor R133 and resistor R130, in series. The junction of the transistor Q21 and capacitor C51 is coupled to positive voltage at terminal 31a through series resistors R136 and R137. The junction of resistors R136 and R137 is connected to ground through resistor R138. The junction of resistors R130 and R133 is coupled through diode D26 to the output 6 of operational amplifier Q22. Amplifier Q22 is operationally equivalent to amplifier Q2 used in conjunction with the first set point.

The coupling diode D26 is positioned so that only negative output signals from transistor Q22 at output 6 of amplifier Q22 can pass therethrough. Thus, transistor Q21 turns off responsive to a negative voltage output from amplifier Q22.

Means are provided for summing the error and control signals. The error signal of the output of operational amplifier Q1 and current amplifier Q3 is connected to terminal 103 which is connected to summation point 6a through a resistor R141. A terminal 104 is connected to the wiper of the first set point control potentiometer. Terminal 104 is connected through resistor R142 to summation point 6a. The offset correct potentiometer P3 is connected to terminal 105 and extends through resistor R143 to summation point 6a. Positive voltage at the cathode of zener Z4 of FIG. 2 extends to terminal 106 and from there through series resistors R144 potentiometer P13 and resistor R146 to ground. The wiper of potentiometer P13 extends through a resistor R147 to summation point 6a. In addition, the wiper on potentiometer P11 extends through terminal 107 and resistor R148 to summation point 6a.

Means responsive to the output of the amplifier Q22 are used to control processes for heating and cooling. More particularly, the output of operational amplifier Q22 is connected through a voltage divider comprising resistors R151 and R152 in series to ground. The junction point of resistors R151 and R152 is connected to the gate of a silicon controlled rectifier diode Q23.

A relay coil K2 extends between an alternating current source 108 and the anode of the SCR Q23. The cathode of SCR Q23 is coupled to ground. Thus, when the gate of SCR Q23 is positive, the coil K2 is energized. A capacitor C58 is provided across the coil to reduce chatter.

The positive output of transistor Q22 causes SCR Q23 to conduct and coil K2 to operate. The operation of coil K2 in turn energizes a solenoid to enable the passage of a cooling fluid or to operate water or a fan or the like.

However, it is desired that the operating time of the coolant be minimized. For example, with ground water, extreme cooling takes place rapidly; therefore, it is desirable to shorten the operating time of the coil K2 to avoid overshoot in the cooled direction.

The circuit of FIG. 10 operates to prevent the overshoot. The positive voltage is blocked by diode D26 connected to the gate of transistor Q21 to cause it to conduct. The conduction of transistor Q21 dumps the charge on capacitor C51 into capacitor C54. The charge is dumped through resistance of rheostat P12. The rheostat and series resistor R132 in conjunction with the capacitor C51 acts as a timing circuit for setting the cooling pulse width; while resistor R136 acts in conjunction with capacitor C51 to alter the charge time during which transistor Q21 is non-conductive. This varies the width of the pulse within the proportioning band. The resistor R132 is selected to adjust the on time of relay coil K2.

The positive charge on capacitor C54 turns the input 2 positive. Therefore, the output of circuit Q22 goes negative to thereby prevent the switch Q23 from turning on. The adjustment of the second set point, the zero adjust as well as the adjustment of the first set point, controls the relationship or the difference between the heating and cooling bands. The circuit 10 tends to keep the cooling solenoid or operator on for short periods of time and off for long periods of time. The circuit also enables adjustment of the pulse rate at the output of operational amplifier Q22.

While the principles of the invention have been described above in connection with specific apparatus and applications, it is to be understood that this description is made only by way of example and not as a limitation on the scope of the invention.

I claim:

1. A controller for controlling the temperature at remote locations in a closed loop system,
    said controller comprising:
    switch means for energizing temperature varying equipment to vary the temperature at the remote locations,
    sensor means for supplying sensor signals that are functions of the temperatures at the remote locations,
    signal treatment means for supplying error signals responsive to the sensor signals,
    control signal source means for supplying control signals to cause the temperatures at the remote locations to reach desired levels,
    said control signal source means including set point signal source means for setting the desired temperature levels to a set point,
    means for summing the control signals and the error signals to obtain summed signals,
    amplifying means attached to said signal treatment means for amplifying said error signal prior to summing said control signals and said error signals,
    operational amplifier means operated responsive to the summed signals for providing output signals, and
    driver means operated responsive to said output signals to control the operation of said switch means to vary the temperatures at said remote locations to obtain said desired levels.

2. The controller of claim 1 wherein said amplifying means comprises differential amplifier means,
    said signal treatment means comprising a bridge circuit,
    said sensor means comprising thermocouple means having one end connected to a midpoint of one leg of the bridge circuit and the other end connected to one input of said differential amplifier,
    means for coupling the other input of said differential amplifier means to the midpoint of the other leg of said bridge,
    and a first amplifier means attached to the output of said differential amplifier means for further amplifying said error signals prior to the summing of said error signals and said control signals and,
    said first amplifier means providing impedance transformation.

3. The controller of claim 1 wherein the output signals of said operational amplifier means cycles on and off within a temperature band about the set point with a proportionally varying on-to-off time per cycle and with the output being entirely on below the band and entirely off above the band, whereby said output is in the form of a square wave signal within the band,
    said closed loop system having a stable point which may be offset from said set point, and
    said control signal source means further including reset signal source means for automatically providing reset signals to reset said stable point to conform to said set point.

4. The controller of claim 3 wherein said automatic reset signal source comprises window detector means attached to said differential amplifier means for determining when the temperature at said remote location is slightly above or slightly below said proportional band,
    clamping means attached to said window detector means for preventing the reset signals from being applied to said summing means unless said temperature at said remote location is within said proportional band.

5. The controller of claim 4 wherein said automatic reset signal source means comprises reset integrator means for measuring the on-to-off time proportion of said operational amplifier means output signals,
    said reset integrator means comprising a resistor capacitor network connected to the output of said operational amplifier,
    analog amplifier means coupled to said resistor capacitor net-work, and
    the output of said analog amplifier means being connected to said summing means to provide an automatic reset signal to vary the square wave output of said operational amplifier means as a function of any offset of said stable point from said set point.

6. The controller of claim 3 wherein said driver means includes trigger means operating responsive to the simultaneous receipt of a synchronous alternating current signal and the operational amplifier output on signals,
    said operational amplifier output signals cycling on and off within a temperature band with a proportional varying on-to-off time within the band,
    said output signal being on below the band and off above the band, and
    means responsive to the operation of said trigger means for providing energization pulses extending over substantially a complete cycle of said alternating current for energizing the switching devices.

7. The controller of claim 6 wherein said trigger means comprises means for providing square wave signals,
   differentiating means for differentiating said square wave signals,
   one shot multi-vibrator means operated responsive to said differentiated square wave signal, oscillator means operated responsive to the output of said one shot multi-vibrator means to provide the energization signals, and
   said one shot multi-vibrator means including a recovery circuit for speeding the recovery of said one shot multi-vibrator means.

8. The controller of claim 7 wherein said oscillator means comprises blocking oscillator means.

9. The controller of claim 1 wherein said control signal producing means includes first and second set point signal sources,
   second means for summing said amplified error signals and said control signals being connected to said second set point signal sources to provdie second summed signals,
   second operational amplifier means operated responsive to the second summed signals, and
   second driver means operated responsive to the output signal of said second operational amplifier means.

10. The controller of claim 9 wherein said second set point control signal is used for operating a cooling apparatus, and
    means for assuring fast turn off of said cooling apparatus.

11. The controller of claim 10 wherein timed negative feedback means are provided for said second operational amplifier means,
    said feedback means comprising a voltage divider network,
    timing network means connected between said voltage divider network and the inverting input of said second operational amplifier means,
    said timing network means comprising first and second series resistors,
    a feedback timing capacitor connected between the junction of said series resistors and ground, and
    means responsive to an output signal from said second operational amplifier means for turning on said cooling apparatus to couple an oppositely charged capacitor in parallel with said feedback timing capacitor.

12. The controller of claim 1 wherein feedback circuit means are provided for causing the output of said operational amplifier to cycle on and off,
    temperature band proximate to said set point so that the output signal is a square wave being a duty cycle with 0% on above the band and 100 percent on below the band with a proportional duty cycle within the band,
    said feedback circuit comprising a series resistor network connecting the output of the operational amplifier to the output and feedback capacitor means extending from said resistor network to ground.

13. A controller for controlling the temperature at remote locations in a closed loop system,
    said controller comprising:
    switch means for energizing temperature varying equipment to vary the temperature at the remote locations,
    sensor means for supplying sensor signals that are functions of the temperatures at the remote locations,
    signal treatment means for supplying error signals responsive to the sensor signals,
    control signal source means for supplying control signals to cause the temperatures at the remote locations to reach desired levels,
    means for summing the cntrol signals and the error signals to obtain summed signals,
    rate circuit means for receiving said error signals prior to said error signal being summed at said control signal,
    said rate circuit means comprising inactive elements said control signal source means including set point signal source means for setting the desired temperature levels to set point,
    operational amplifier means operated responsive to the summed signals for providing output signals, and
    driver means operated responsive to said output signals to control the operation of said switch means to vary the temperatures at said remote locations to obtain said desired temperature levels.

14. The controller of claim 13 wherein the output of said amplifying means is connected to rate circuit means,
    said rate circuit means comprising a first capacitor in parallel with the first resistor,
    said parallel combination of said first capacitor and first resistor connected in series with a second resistor, and
    said second resistor being connected to the means for summing the control signals and the error signals.

15. A controller for controlling the temperature at remote locations in a closed loop system,
    said controller comprising:
    switch means for energizing temperature varying equipment to vary the temperature at the remote locations,
    signal treatment means for supplying error signals responsive to the sensor signals,
    control signal source means for supplying control signals to cause the temperatures at the remote locations to reach desired levels,
    said control signal source means including set point signal source means for setting the desired temperature levels to a set point,
    said set point signal source means comprising constant current source means,
    digital switch means coupled to said constant current source means to provide set point signals that are functions of the resistance of said digital switch means,
    said digital switch means simulating the characteristic curve of said sensor means,
    means for summing the control signals and the error signals to obtain summed signals,
    operational amplifier means operated responsive to the summed signals for providing output signals, and
    driver means operated responsive to said output signals to control the operation of said switch means to vary the temperatures at said remote locations to obtain said desired temperature levels.

16. The controller of claim 15 wherein said digital switch means is connected to provide positive or negative set points.

17. The controller of claim 16 wherein safety means are provided to detect certain deviations from the normal otuput of said constant current source, and
means responsive to the detection of said deviations for changing the output of said set point signal source to prevent failure of the closed loop system if said digital switch means opens.

18. A controller comprising a source of electrical power,
thermocouple means,
operational amplifier means connected to said source and to said thermocouple means and responsive to said thermocouple means for manifesting a first output signal when the temperature of said thermocouple means is below a predetermined limit, and a second output signal when the temperature of said thermocouple means is above said predetermined limit,
sensing means connected to said source of power for sensing a restoration of power after an interruption thereof,
means for connecting said sensing means with said operational amplifier means for forcing said operational amplifier means to manifest said first output signal for a predetermined interval following said restoration,
amplifying means for amplifying the signals from said thermocouple means,
control signal source means for providing signals to set the controller to provide a desired temperature at said thermocouple means, and
means for summing said control signals and the amplified signals from said thermocouple means connected between said amplifying means and said operational amplifier means.

19. The controller of claim 18 and rate circuit means coupled to operate on said error signal between said amplifier means and said operational amplifier, and the components of said rate circuit being passive.

20. The controller of claim 18 including set point signal source means for providing a set point signal to cause the temperature at the location of the sensor to reach and maintain a set point,
said set point signal source comprising constant current means and two terminal digital resistor means for simulating the characteristic curve of the sensor.

21. A controller comprising sensing means for producing an electrical signal in response to the value of a physical parameter,
the controller having an output terminal,
proportional signal generating means connected to said sensing means and responsive to said electrical signal for producing a proportional signal at said output terminal,
said proportional signal having a duty cycle related to the deviation of the sensed level of said parameter from a preselected level over a given range of said parameter,
said proportional signal generating means comprising an operational amplifier, a first voltage divider connected to the output of said operational amplfiier, negative feedback means connecting said first voltage divider to the inverting input of said amplifier for supplying negative feedback to said amplifier, a second voltage divider connected with the output of said operational amplifier,
means for connecting said second voltage divider to the non-inverting input of said operational amplifier to supply positive feedback to said operational amplifier, and
capacitor means connected between said negative feedback means and a source of reference potential.

22. The controller of claim 21 including first amplifier means connected to said sensing means for providing an amplified error signal,
control signal source means for providing control signals to control the output signal to cause said physical parameter to reach and maintain a set point, and
summing means for summing said amplified error signals and said control signals between said amplifier means and said operational amplifier.

23. The controller of claim 22 wherein passive rate circuit means are provided between said amplifier means and said summing means.

24. The controller of claim 22 wherein said control signal source means comprises constant current source means,
digital switch means coupled to said constant current source means to simulate the characteristic curve of said sensing means.

25. The controller of claim 22 wherein said control signal source means comprises automatic reset signal source means for providing a signal to reset any offset between a stable parameter reached under the control of the controller and the set point of control signals.

26. The controller of claim 25 and means for preventing a reset signal when the error signal is not within the given range of said parameter.

* * * * *

UNITED STATES PATENT OFFICE
CERTIFICATE OF CORRECTION

Patent No. 3,819,960     Dated June 25, 1974

Inventor(s) MITCHELL I. KOHN and AHDOR HERMYRT ALTON

It is certified that error appears in the above-identified patent and that said Letters Patent are hereby corrected as shown below:

Column 1, line 1:   "continuation in part" should be --continuation-in-part--

Column 3, line 66   "field." should be --shield.--

Column 7, line 58:  "constant" should be --current--

Column 9, line 45:  after "ground" delete "when"

Column 11, line 45: "being" should be --begin--

Column 19, line 21: "provdie" should be --provide--

Column 20, line 9:  "cntrol" should be --control--

Column 20, line 14: insert --,-- after "elements"

Signed and sealed this 26th day of November 1974.

(SEAL)
Attest:

McCOY M. GIBSON JR.
Attesting Officer

C. MARSHALL DANN
Commissioner of Patents